H. L. BLOOD.
PLANER AND SYSTEM OF MOTOR CONTROL THEREFOR.
APPLICATION FILED JAN. 7, 1918. RENEWED NOV. 23, 1918.

1,311,209.

Patented July 29, 1919.

INVENTOR
Harold L. Blood
BY S. Jay Teller
ATTORNEY

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

1,311,209.  Specification of Letters Patent.  Patented July 29, 1919.

Original application filed September 26, 1914, Serial No. 863,600. Divided and this application filed January 7, 1918, Serial No. 210,625. Renewed November 23, 1918. Serial No. 263,935.

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor, of which the following is a specification.

The invention relates particularly to planers of the type in which each is provided with a reversing driving motor and a generator connected in closed circuit with the motor to supply current thereto and to control it. However, as concerns certain features, the invention is not limited to a planer having a generator motor driving system, and as concerns still other features the invention is not limited to a driving system used in connection with a planer or equivalent machine. It will be understood that when the term "planer" is used herein the intention is to include not only planers strictly so defined, but other machines similar in operation or in function and characterized by having an element which is regularly reciprocated automatically.

This application constitutes a division of my copending application Serial No. 863,600 for planers and systems of motor control therefor, filed September 26th, 1914. One of the objects of the present invention is to provide an apparatus of the type set forth in the said application having certain mechanical and electrical features which are advantageous under certain conditions of use. The objects of the invention will be more fully understood from the following specification and claims.

Of the drawings which illustrate the preferred embodiment of the invention:

Figure 1:
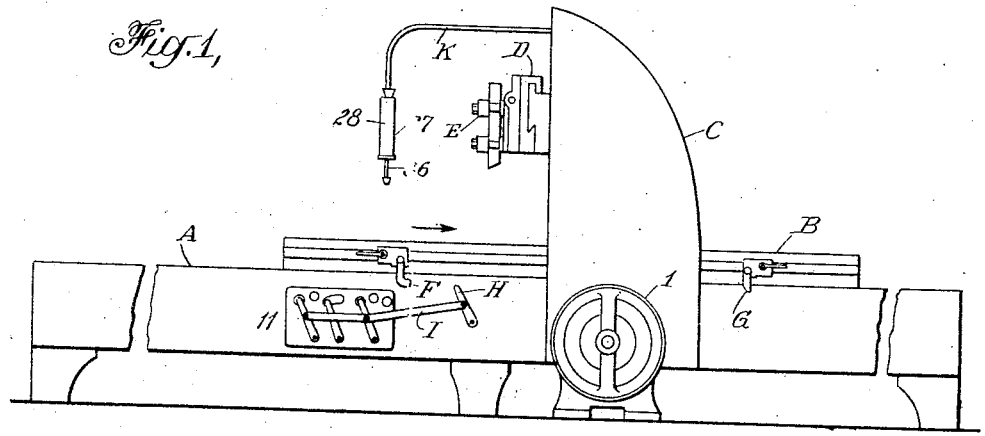
Figure 1 is a side view of a planer and a system of motor control therefor.
Figure 2:
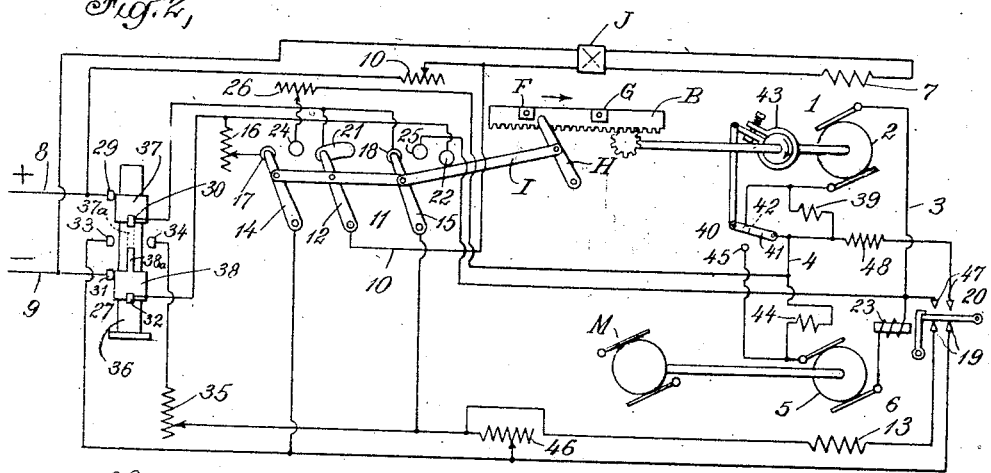
Fig. 2 is a view showing diagrammatically some of the mechanical features of the planer shown in Fig. 1 and also diagrammatically showing the electrical connections.

Referring now more particularly to Fig. 1, there is illustrated a planer having a bed A, a reciprocating table B on the bed, a housing C carrying the crossrail D and a tool and tool holder E carried by the crossrail. The planer is provided with a motor 1 connected through suitable mechanism (such as shown in Fig. 2) with the reciprocating table B. Suitable means is provided for supplying current to the armature 2 of the motor. In accordance with certain features of my invention the motor armature is permanently connected, as by the leads 3, 4, to the armature 5 of a generator 6 adapted to be driven at a substantially constant speed by a suitable means such as an electric motor M. The excitation of the motor 1 is secured through a field winding 7 connected across the mains 8, 9.

The planer is provided with an automatic switch 11 which is normally operated by the reciprocating table. The table is provided with adjustable tappets F and G which are adapted to alternately engage a lever H connected with the switch 11 by means of a rod I. When the automatic switch 11 is in its left-hand position connections are made for the forward or cutting stroke of the planer, and when the automatic switch 11 is thrown to its right-hand position connections are made for the idle or return stroke. A series resistance 10 is provided for the motor field 7. With the parts in position for the return stroke the resistance 10 is in series with the field which is thus made relatively weak, the motor having a relatively high speed. When the switch 11 is moved to its left-hand position as shown in Fig. 2, the motor field 7 is strengthened by having this series resistance 10 short-circuited at the middle blade 12 of the automatic switch by means of the connection 10', giving in this way a stronger field and correspondingly lower motor speed during the cutting stroke. It will be noted that the field current of the motor traverses the field circuit always in the same direction, varying simply in magnitude according to the direction of travel of the planer table.

The reversal of direction of rotation of the motor is effected by reversing the polarity of the generator field winding 13, the terminals of which are connected, as indicated, to the left-hand and right-hand blades 14, 15, respectively, of the automatic switch 11. An adjustable resistance 16 is provided in the circuit leading to the first upper contact 17 of the switch. When the automatic switch 11 is thrown toward the left to the position shown for the cutting stroke of the planer, a circuit is completed from the positive main 8, through the contact 18 and right-hand blade 15 of the automatic switch, toward the right through the generator field 13, thence through the contacts 19 of the circuit breaker 20, left blade 14 and contact 17 of the automatic switch, and through the series resistance 16 to the negative main 9. When the switch is thrown toward the right for the return stroke of the planer the generator field current passes from the positive main 8 through the contact 21 and left-hand blade 14, contacts 19, toward the left through the field winding 13, thence through the right-hand blade 15 and contact 22 of the automatic switch to the negative main 9, thus reversing the generator field and omitting from the field circuit the resistance 16. In this way, during the return stroke, there is a weaker motor field of the same polarity as before together with a stronger generator field of reversed polarity, resulting in a reversed rotation of the motor at a speed considerably higher than before. The ratio of cutting speed to return speed may be varied by the adjustment of the resistances 16 and 10 which respectively control the two speeds. In case the stroke normally operated at the lower speed is to be used for the return or idle stroke and the stroke normally operated at the higher speed is to be used for the cutting stroke it is simply necessary to reverse the leads to the motor field or the leads to the dynamo field. A reversing switch J may be provided for this purpose.

In the normal operation of the apparatus the switch 11 is automatically thrown from cutting position to return position by the movement of the planer table at a time shortly prior to the completion of the cutting stroke. There is then a rapid braking of the motor, followed by the acceleration in the opposite direction to a higher speed, which speed is maintained until, at about the end of the return stroke, the automatic switch is thrown over to the cutting position. Then the motor is brought to rest and attains the slower speed in the other direction for the cutting stroke, and this cycle of operations is repeated indefinitely.

If at any time during the operation of the apparatus it is found desirable to stop the motor, the automatic switch 11 may be manually thrown to central position. The elongated contact 21 serves to maintain the short circuit around the resistance 10 when the switch 11 is in central position, thus insuring a powerful braking action.

If desired, the operation of the apparatus may be stopped by disconnecting the switch 11 from the mains 8, 9 by suitable manual or automatic devices, one of which will be described. In case the armature current in the circuit 2, 3, 5, 4 becomes excessive, the apparatus may be protected from over load, as by the circuit-breaker 20, whose coil 23 operates at a predetermined current value therein, to open-circuit the generator field.

Now, in order that the motor may be brought to rest promptly without any excessive or uncertain extent of travel subsequent to the deënergization of the generator field means is provided for causing the field magnetism of the generator to assume approximately zero value promptly upon the opening of the field circuit or upon the interrupting of the field current. Preferably a part or all of the magnetic circuit of the generator is made of steel laminations or is otherwise constructed in such a way as to reduce to a negligible amount the residual magnetism of the generator. In practice it is found that certain kinds of steel which are best obtained in the form of laminations possess the required low retentiveness. In this way the induced voltage of the generator drops to practically zero the moment the field is deënergized and no current is sent through the armature of the motor. The generator being thus substantially completely deënergized, permits the motor to exert a powerful, rapid and definite braking influence which is not in any way interfered with by electromotive force developed by the generator. Without means for substantially completely deënergizing the generator, sufficient current would be developed even with the generator field circuit open to cause the motor to continue its travel at a low speed but nevertheless to an extent that might well be disastrous to the planer or to an attendant. It will be clear that if such slow movement or creeping were allowed to continue, the switch 11 would automatically be moved to one or the other of its operative positions and the planer would be automatically started. By thus obviating subsequent travel or creeping of the motor there is no need of opening at any time the single circuit 5, 4, 2, 3 that carries heavy current in the entire system. The control is thus exclusively of circuits carrying comparatively small currents, insuring compact and inexpensive switching mechanism easily operated and consuming no appreciable electrical energy.

The reduction or elimination of residual field magnetism of the generator may also be effected by providing means for sending a preliminary reversed current through the generator field circuit prior to the admission thereto of the main reversed energizing current. Preferably when use is made of such a preliminary reversed current, the current is obtained from the main conductors 3 and 4 as the voltage therein is reversed from time to time and always corresponds with the polarity of the generator field 13. It will be clear that connections can easily be made whereby current obtained from the said conductors 3 and 4 will always oppose the field 13. As shown in Fig. 2, contacts 24 and 25 are located to be engaged respectively by the switch levers 14 and 15 when in central positions. The contacts 24 and 25 are connected respectively with the conductors 4 and 3, the connection for the contact 24 preferably being through an adjustable resistance 26. In the ordinary operation of the apparatus the switch arms 14 and 15 sweep quickly over these middle contacts 24 and 25 on their way to their end positions. In this way a current is momentarily sent through the field 13, this current always being in a direction to oppose and overcome the residual magnetism of the field. By thus promptly reducing or eliminating the residual magnetism the braking effect of the motor is increased for the reason that the braking current does not have to overcome the electromotive force arising from the residual magnetism. The resistance 26 when used, may be adjusted so as to vary the strength of the demagnetizing current. The prompt braking of the motor will occur either when the switch is in mid-position only momentarily in passing from one end position to the other as in ordinary operation, or when the switch is simply brought to mid-position and left there as in stopping the planer. In case the switch is left in the position to effect stopping the residual magnetism may be so completely overcome as to entirely eliminate all danger of creeping.

As already stated, the residual magnetism may be overcome or eliminated either by the construction of the generator field of laminated metal or by the provision of means for sending a momentary reversed current through the field winding. Each of these means is effective and under favorable circumstances may be used independently of the other. Preferably, however, in order to have double assurance of the complete elimination of residual magnetism, I prefer to provide both of these means in combination. It will be clear that with the laminated construction the residual magnetism will automatically approximate zero value upon the interrupting of the field current, and by properly regulating the strength of the preliminary reversed current the residual magnetism can be still further reduced.

For certain purposes, as in an emergency or in making preliminary adjustments, it is often desirable to have a conveniently located and portable means for stopping the motor promptly and operating it in either direction at will, preferably at a comparatively low speed. A preferred device for permitting these operations is illustrated in Fig. 2. The auxiliary control above referred to is effected through a master switch 27. This switch comprises an outer cylinder 28 which carries three pairs of contacts 29—30, 31—32 and 33—34. The contacts 29 and 31 are connected respectively with the mains 8 and 9; the contacts 30 and 32 are connected respectively with the switch contacts 18 and 17; and the contacts 33 and 34 are connected respectively with the two sides of the generator field winding 13, preferably through an adjustable resistance 35. Preferably the switch 27 is connected to the planer by a cable K which includes the conductors connected with the several contacts. Axially and rotatably movable within the cylinder 28 is a rod 36 carrying contacts 37 and 38 adapted to engage the contacts 29—34. When the rod is in its lower position as shown in Fig. 2 the contacts 29 and 31 are connected respectively with the contacts 30 and 32 and the system operates in the manner already described. When the rod is moved upward the contacts 37 and 38 are disengaged respectively from the contacts 30 and 32 and in this way the switch 11 is disconnected and rendered inoperative. The contacts 37 and 38 are provided respectively with extensions 37ª and 38ª and by turning the rod 36 in one direction or the other these can be engaged with the contacts 33 and 34 to send current through the generator field winding 13 in either direction as desired. In this way the operator by means of the switch 27 can disconnect the switch 11 and can manually control the operation of the system. Because of the resistance 35 the field 13 is weakly energized thus causing the motor to rotate slowly when under manual control. Inasmuch as the main automatic switch 11 is entirely disconnected, any movement of this switch either manually or by the table as it travels will have no effect upon the operation of the generator or the motor.

Inasmuch as the motor during normal operation rotates faster during the return stroke than during the cutting stroke, the tendency is for the braking effect following return to be greater than the braking effect following cutting. It is desirable to have each braking action as powerful and as rapid as the motor will stand without injury, and in order that the braking effect following the relatively slow cutting movement may have maximum value without causing the braking effect following the faster return movement to be too great, I prefer to provide means whereby the braking effect following the return movement is automatically reduced. This I accomplish by momentarily weakening the motor field during the said braking action. Preferably the motor is compounded, being provided with a series winding 39 which is so connected as to aid the field 7 during the return stroke and to oppose it during the cutting stroke.

The effect of this arrangement of the motor field windings is to limit the braking current when decelerating after the return stroke. At this time the current is flowing in the same direction as on the cutting stroke which causes the series field to oppose field 7 thus reducing the braking current since the motor is acting as a generator.

During the cutting stroke the effect of the series field is to decrease torque under heavy cuts. This may be undesirable, in which case a switch 40 is provided, with contacts 41 and 42 adapted to short-circuit the series field of the motor. This switch may be operated from the planer mechanism by any desired means, for instance by a connection 43 which will close the switch at the start of the cutting stroke and open it at the start of the return stroke.

Preferably the generator 6 is also compounded, being provided with a series field 44 which is so wound as to aid the field 13 to prevent the generated voltage from falling under load. The switch 40, if desired, may be provided with a contact 45, connected as shown, to short-circuit the generator series field 44 during the return stroke. This causes the generator field to reverse more slowly, at the end of the return stroke, than if the compound winding were effective. This action still further reduces the braking current.

Preferably an ohmic resistance 46 is connected in shunt across the field of the generator. This resistance acts as a field discharge resistance to protect the windings.

The circuit breaker 20, in addition to being provided with the contacts 19, is preferably also provided with contacts 47 connected respectively with the main conductors 3 and 4, one of them being connected through the low resistance 48. When the current in the coil 23 becomes sufficiently great the magnet armature is moved to release the swinging bar of the circuit breaker which moves on the action of the spring to disconnect the two contacts 19 and to connect the two contacts 47. In this way the field circuit of the generator is opened and the generator and motor armatures are short-circuited through a low resistance. By short-circuiting the generator and motor armatures a more rapid braking is secured than would be secured by merely opening the generator field circuit.

When the automatic switch 11 is reversed by the planer dogs or otherwise, the generator armature is, for the moment, practically nothing but an ohmic resistance across the rotating armature of the motor inasmuch as the generator field current is *nil*. With the motor field energized at such time from current across the mains, there is developed a powerful dynamic braking action due to this low resistance circuit across the motor armature, with substantially no opposing electromotive force at the generator. In practice, the parts are so proportioned that the negative torque at this time is as great as possible consistent with safety of operation and wear on the several parts. During the periods of dynamic braking the generator is run as a motor, storing energy either in a fly-wheel, if one be provided in connection with the constant speed drive, or returning power to the main through the generator driving motor M, if a motor drive is utilized, or the power thus obtained from the braking of the planer motor may be made available in other ways to decrease the net power required for the entire operation of the machine.

Figure 3:
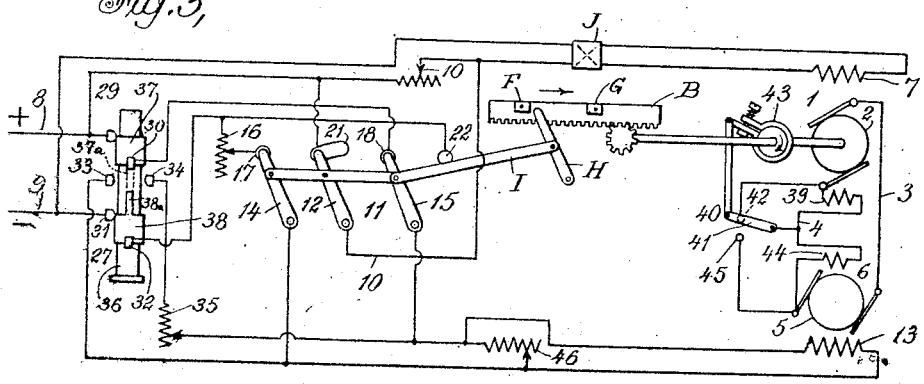
Fig. 3 is a view similar to Fig. 2 but showing another embodiment of the invention.

In Fig. 3 I have illustrated a somewhat simpler embodiment of my invention. This construction is similar to that shown in Fig. 2, except that the circuit breaker 20 and associated parts are omitted and that the means for supplying a supplemental reversed current to the generator field are omitted. Repetition of description is unnecessary.

What I claim is:—

1. In a planer or other machine having a reciprocating table, the combination with the table, of a reversing compound motor connected with the table, a generator having its armature connected in closed circuit with the motor armature, automatic means for successively reversing the generator polarity to successively reverse the motor and thereby cause it to drive the table successively in opposite directions, and automatic means for short-circuiting the series field of the motor during rotation of the motor in one direction.

2. In a planer or other machine having a reciprocating table, the combination with the table, of a reversing compound motor connected with the table, a generator having its armature connected in closed circuit with the motor armature, automatic means for successively reversing the generator polarity to successively reverse the motor and thereby cause it to drive the table successively in opposite directions, the motor acting as a generator during such reversal to effect dynamic braking, means for causing the motor to have higher speed in one direction than in the other, and automatic means for short-circuiting the series field of the motor during rotation of the motor in the low speed direction.

3. In a planer or other machine having a reciprocating table, the combination with the table, of a reversing motor connected with the table, a compound generator having its armature connected in closed circuit with the motor armature, automatic means for successively reversing the generator polarity to successively reverse the motor and thereby cause it to drive the table successively in opposite directions, and automatic means for short-circuiting the series field of the generator during rotation of the motor in one direction.

4. In a planer or other machine having a reciprocating table, the combination with the table, of a reversing motor connected with the table, a compound generator having its armature connected in closed circuit with the motor armature, automatic means for successively reversing the generator polarity to successively reverse the motor and thereby cause it to drive the table successively in opposite directions, the motor acting as a generator during such reversal to effect dynamic braking, means for causing the motor to have higher speed in one direction than in the other, and automatic means for cutting out the series field of the generator during rotation of the motor in the high speed direction.

5. In a planer or other machine having a reciprocating table, the combination with the table, of a reversing compound motor connected with the table, a compound generator having its armature connected in closed circuit with the motor armature, automatic means for successively reversing the generator polarity to successively reverse the motor and thereby cause it to drive the table successively in opposite directions, and automatic means for short-circuiting the series field of the motor during rotation of the motor in one direction and for short-circuiting the series field of the generator during rotation of the motor in the other direction.

In testimony whereof I hereto affix my signature.

HAROLD L. BLOOD.